United States Patent
Han et al.

(10) Patent No.: US 9,666,212 B2
(45) Date of Patent: May 30, 2017

(54) WRITER WITH PROTRUDED SECTION AT TRAILING EDGE

(71) Applicant: Seagate Technology LLC, Cupertino, CA (US)

(72) Inventors: Xifeng Han, Eden Prairie, MN (US); Jason Bryce Gadbois, Shakopee, MN (US); Kaizhong Gao, Shoreview, MN (US); Arkajyoti Misra, Chanhassen, MN (US); Harry Sam Edelman, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 556 days.

(21) Appl. No.: 13/705,984

(22) Filed: Dec. 5, 2012

(65) Prior Publication Data
US 2014/0153134 A1    Jun. 5, 2014

(51) Int. Cl.
| | |
|---|---|
| G11B 5/187 | (2006.01) |
| G11B 5/012 | (2006.01) |
| G11B 5/127 | (2006.01) |
| G11B 5/31 | (2006.01) |
| G11B 5/48 | (2006.01) |
| G11B 5/74 | (2006.01) |

(52) U.S. Cl.
CPC ............. *G11B 5/012* (2013.01); *G11B 5/1278* (2013.01); *G11B 5/187* (2013.01); *G11B 5/315* (2013.01); *G11B 5/3116* (2013.01); *G11B 5/3146* (2013.01); *G11B 5/4886* (2013.01); *G11B 5/746* (2013.01)

(58) Field of Classification Search
USPC ............ 360/125.09, 125.13, 125.59, 125.64
See application file for complete search history.

(56) References Cited

U.S. PATENT DOCUMENTS

| | | |
|---|---|---|
| 4,068,268 A | 1/1978 | Idemoto et al. |
| 4,097,908 A | 6/1978 | Chou et al. |
| 4,593,205 A | 6/1986 | Bass et al. |
| 4,935,835 A | 6/1990 | Godwin et al. |
| 5,867,341 A | 2/1999 | Volz et al. |
| 6,188,535 B1 | 2/2001 | Lemke et al. |
| 6,404,576 B1 | 6/2002 | Hamaguchi et al. |
| 6,473,254 B1 | 10/2002 | Hamaguchi et al. |
| 6,534,974 B1 | 3/2003 | Bowen et al. |
| 6,754,045 B2 | 6/2004 | Korkowski et al. |
| 6,873,587 B2 | 3/2005 | Hashimoto |
| 6,944,112 B2 | 9/2005 | Challener |
| 6,950,260 B2 | 9/2005 | Coffey et al. |
| 7,027,248 B2 | 4/2006 | Hamaguchi et al. |
| 7,219,414 B2 | 5/2007 | Watabe et al. |
| 7,472,471 B2 | 1/2009 | Sasaki et al. |
| 7,508,619 B2 | 3/2009 | Okamoto et al. |
| 7,796,353 B2 | 9/2010 | Schabes et al. |

(Continued)

*Primary Examiner* — Jefferson Evans
(74) *Attorney, Agent, or Firm* — Hollingsworth Davis, LLC

(57) ABSTRACT

A writer includes a leading edge, a trailing edge, a longitudinal axis defined between the leading and trailing edges, and a transverse axis orthogonal to the longitudinal axis. A writer region is provided at a protruded section of the trailing edge oriented along the longitudinal axis. A write pole is arranged at the protruded section to write data to two locations spaced apart from one another relative to the transverse axis for a range of skew angles.

24 Claims, 13 Drawing Sheets

(56) References Cited

U.S. PATENT DOCUMENTS

| | | |
|---|---|---|
| 7,796,360 B2 * | 9/2010 | Im .................... G11B 5/1278 360/122 |
| 7,796,361 B2 * | 9/2010 | Sasaki et al. ............ 360/125.13 |
| 7,835,094 B2 | 11/2010 | Bedillion |
| 7,848,046 B2 | 12/2010 | Sakurai et al. |
| 7,852,587 B2 | 12/2010 | Albrecht et al. |
| 7,855,853 B2 | 12/2010 | Linville et al. |
| 7,876,531 B2 | 1/2011 | Bozeman et al. |
| 7,877,860 B2 | 2/2011 | Sasaki et al. |
| 7,894,159 B2 | 2/2011 | Lengsfield, III et al. |
| 8,270,109 B2 * | 9/2012 | Ohtsu ................. G11B 5/1278 360/125.03 |
| 8,305,711 B2 * | 11/2012 | Li ...................... G11B 5/1278 360/125.09 |
| 8,335,051 B2 * | 12/2012 | Nunokawa ............ G11B 5/3116 29/603.14 |
| 8,619,390 B2 * | 12/2013 | Cazacu ................ G11B 5/1278 360/125.06 |
| 9,495,996 B2 * | 11/2016 | Gao .................... B82Y 10/00 |
| 2002/0024755 A1 * | 2/2002 | Kim et al. ...................... 360/55 |
| 2002/0080523 A1 * | 6/2002 | Sato et al. .................... 360/126 |
| 2002/0131188 A1 | 9/2002 | Hamaguchi et al. |
| 2004/0027709 A1 | 2/2004 | Hamaguchi et al. |
| 2006/0002017 A1 * | 1/2006 | Taguchi ............... G11B 5/1278 360/125.13 |
| 2006/0077589 A1 | 4/2006 | Sasaki et al. |
| 2006/0225268 A1 * | 10/2006 | Le et al. .................... 29/603.14 |
| 2007/0188918 A1 * | 8/2007 | Im et al. ...................... 360/126 |
| 2007/0211382 A1 * | 9/2007 | Mochizuki .......... G11B 5/1278 360/125.09 |
| 2008/0316631 A1 | 12/2008 | Gao et al. |
| 2009/0002868 A1 | 1/2009 | Mallary et al. |
| 2009/0002896 A1 | 1/2009 | Mallary et al. |
| 2009/0021861 A1 | 1/2009 | Vas'ko et al. |
| 2009/0097152 A1 | 4/2009 | Gao et al. |
| 2009/0195916 A1 | 8/2009 | Chauhan et al. |
| 2009/0213496 A1 * | 8/2009 | Kato et al. ............... 360/125.12 |
| 2009/0251821 A1 | 10/2009 | Song et al. |
| 2009/0277870 A1 | 11/2009 | Sasaki et al. |
| 2009/0294402 A1 | 12/2009 | Araki et al. |
| 2009/0323216 A1 | 12/2009 | Ishiguro |
| 2010/0061018 A1 | 3/2010 | Albrecht et al. |
| 2010/0079903 A1 | 4/2010 | Au et al. |
| 2010/0091618 A1 | 4/2010 | Schabes et al. |
| 2010/0302672 A1 | 12/2010 | Aoki et al. |
| 2010/0302680 A1 | 12/2010 | Hirata et al. |
| 2010/0321815 A1 | 12/2010 | Zhou et al. |
| 2010/0321825 A1 | 12/2010 | Nazarov |
| 2010/0321835 A1 | 12/2010 | Zhang et al. |
| 2011/0007428 A1 | 1/2011 | Batra et al. |
| 2011/0019306 A1 | 1/2011 | Sakurai et al. |
| 2011/0032637 A1 | 2/2011 | Bedillion |
| 2011/0096638 A1 * | 4/2011 | Mochizuki et al. ....... 369/13.33 |

* cited by examiner

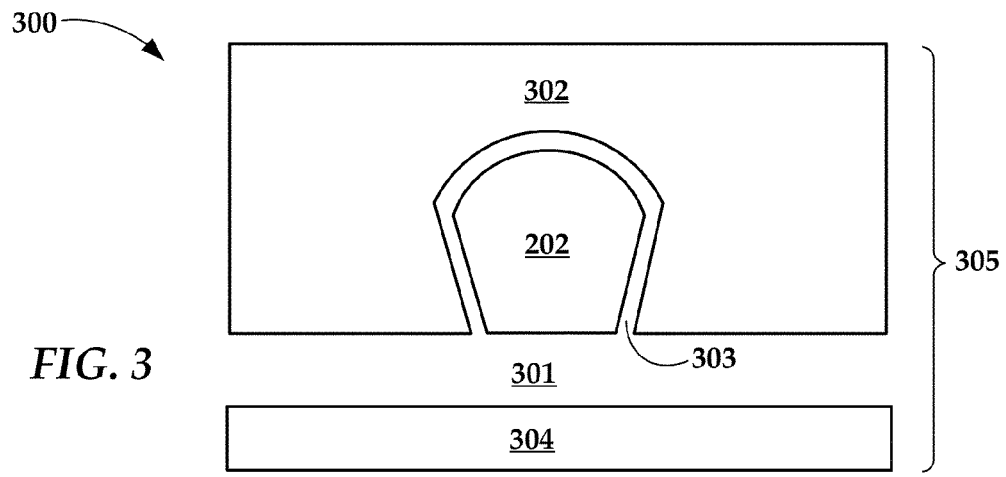
FIG. 3
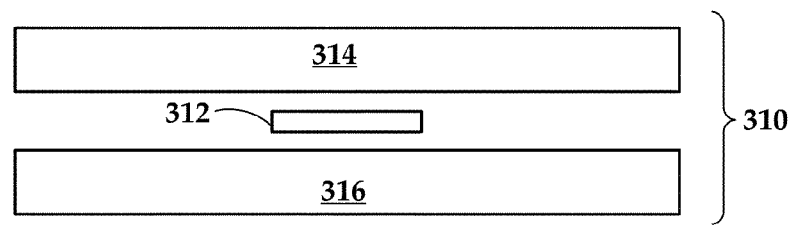
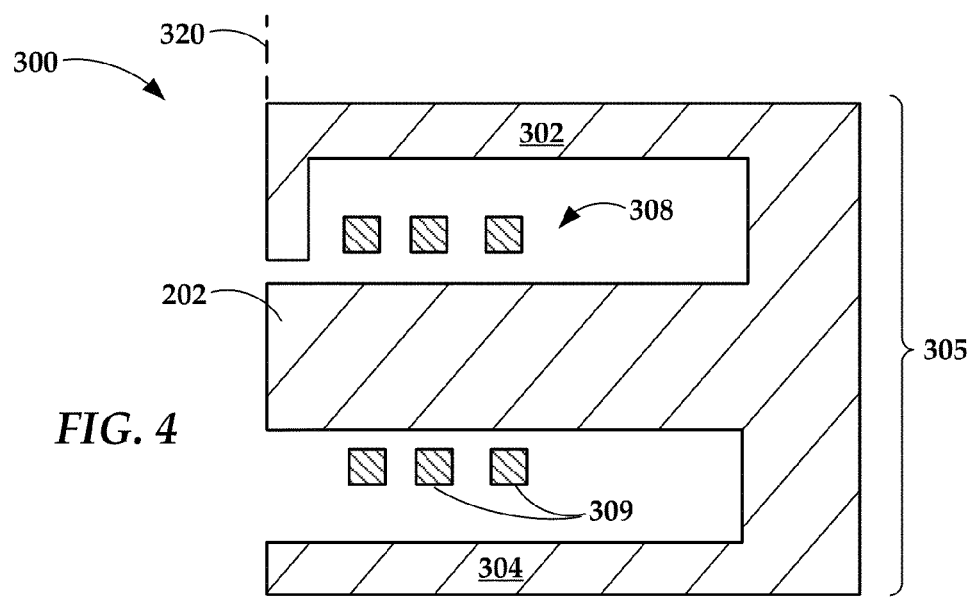
FIG. 4
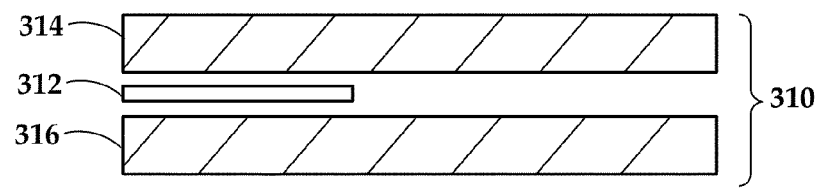

WRITER WITH PROTRUDED SECTION AT TRAILING EDGE

SUMMARY

The present disclosure is related to data storage devices. In one embodiment, a writer includes a leading edge, a trailing edge, a longitudinal axis defined between the leading and trailing edges, and a transverse axis orthogonal to the longitudinal axis. A writer region is provided at a protruded section of the trailing edge oriented along the longitudinal axis. A write pole is arranged at the protruded section to write data to two locations spaced apart from one another relative to the transverse axis for a range of skew angles.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

FIG. 3 is a plan view of a transducer assembly as seen from a media reading surface according to an example embodiment;

FIG. 4 is a cross-sectional view of the transducer shown in FIG. 3;

DETAILED DESCRIPTION

Figure 1A:
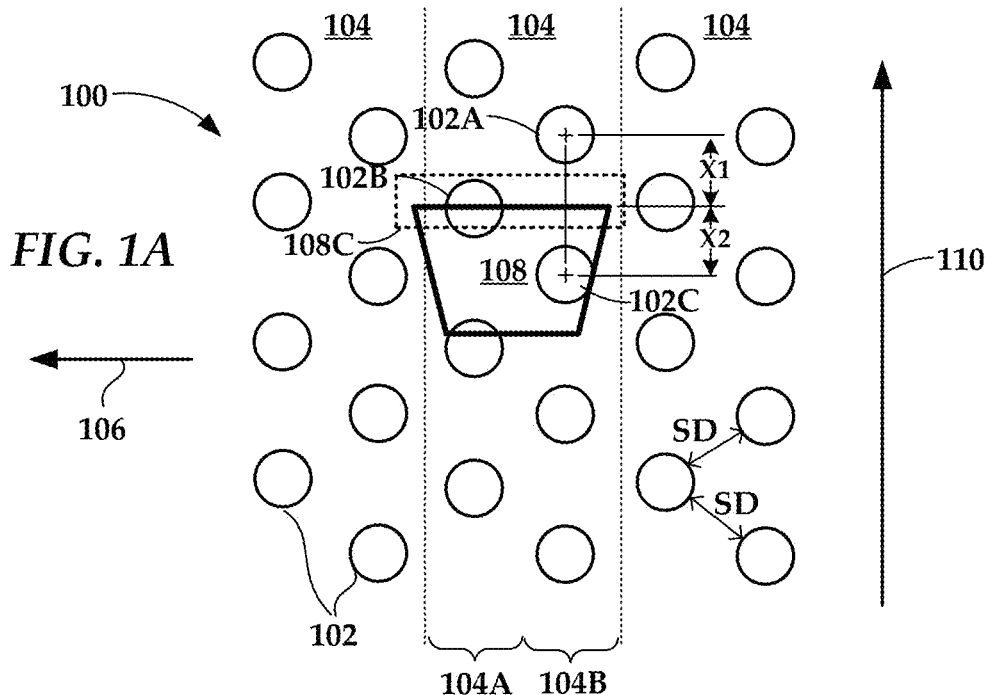
FIGS. 1A-1B are block diagrams of a writer and media according to an example embodiment.

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to magnetic data recording, such as used in hard disk drives (HDDs) and similar devices. Magnetic drive architectures often use perpendicular magnetic recording technology to store data on the magnetic medium. Perpendicular recording can provide more than three times the areal density (AD) for data storage than the previous generation, longitudinal recording architectures. Perpendicular recording and other enhancements have allowed hard drives to steadily increase data storage density over the past decades. However, additional technology advances may be needed to continue this pace of growth.

The theoretical maximum AD of perpendicular recording architectures is bounded by what is known as the superparamagnetic limit. The superparamagnetic limit relates to the tendency of magnetic grains to randomly flip magnetic orientation in response to thermal fluctuations. The superparamagnetic limit defines a lower bound on the area in which an individual bit can be reliably stored. As a result, existing perpendicular recording technologies can only be scaled down so much before being restricted by the superparamagnetic limit of currently used magnetic media.

There are some future technologies proposed to address the superparamagnetic limit. For example, so-called "patterned" or "bit patterned" magnetic media have been proposed to overcome the superparamagnetic effect. The term "patterned" media generally refers to magnetic data/information storage and retrieval media having a plurality of discrete, independent regions of magnetic material formed on a non-magnetic substrate. The magnetic regions form discrete, independent magnetic elements which function as recording bits.

In patterned media, the regions of ferromagnetic material having the magnetic bits or elements are independent of each other, and so mutual interference between neighboring bits can be minimized. This can reduce recording losses and noise arising from neighboring magnetic bits. In addition, patterning of the magnetic layer increases resistance to domain wall movement, e.g., enhances domain wall pinning.

In some embodiments, the magnetic bits or elements of patterned media may have about the same size and shape, and may be made of the same magnetic material as each other. In such a configuration, the elements may be arranged in a regular pattern over the substrate surface, with each element having a small size and desired magnetic anisotropy. The magnetic moment of each discrete magnetic element has two states: the same in magnitude but aligned in opposite directions. In the absence of an externally applied magnetic field, the magnetic moments of each discrete magnetic element will be aligned along the same magnetic easy axis. Each discrete magnetic element forms a single magnetic domain or bit and the size, area, and location of each domain is determined during the fabrication process.

During writing operation of patterned media, the direction of the magnetic moment of the single magnetic domain element or bit is flipped along the easy axis, and during reading operation, the direction of the single magnetic domain element or bit is sensed. The direction of the magnetic easy axis of each single magnetic domain, element, or bit can be parallel or perpendicular to the surface of the domain, element, or bit, corresponding to conventional continuous longitudinal and perpendicular media, respectively. The nature/type of the magnetic recording layer of the magnetic domain elements or bits is not critical in patterned media, and may, for example, be selected from among longitudinal, perpendicular, laminated, anti-ferromagnetically coupled (AFC), granular, and superlattice, for example.

Patterned media allows for a simplified writing process, potentially resulting in lower noise and lower error rate than conventional media for high areal density recording. In patterned disk media, the writing process does not define the location, shape, and magnetization value of a bit, but flips the magnetization orientation of an existing patterned single domain magnetic structure. Writing of data in patterned disk media may be tolerant to cross-track misalignments, such as where the transducer head deviates slightly from the intended bit location and partially overlaps neighboring bits, as long as only the magnetization direction of the intended bit is flipped. Crosstalk between neighboring bits during read operations may also be reduced in patterned media relative to conventional media for high areal density recordings. Each individual magnetic element, domain, or bit of a patterned medium can be tracked individually, and reading may be less jittery than in conventional disks.

A device utilizing patterned media may generally use a transducer (often referred to as a slider and/or read/write head) to apply the magnetic field to the elements during writing and sense the magnetic orientation of the element during reading. A conventional tracking mechanism may be used to move the transducers to different tracks on the media disk while the disk is spinning. The tracking mechanism may at least include one or more arms held over a surface of the disk and a motor (e.g., voice coil motor or VCM) that moves the arm. The transducers are positioned at one end of the arm, and the VCM rotates the other end of the arm to move the transducer to different tracks on the media.

While a rotating arm is fast and reliable, it results in skewing of the read/write transducer. This is because the transducer end of the arm follows an arcuate path from an inner to an outer radius of the disk while tracking. This arcuate path results in the transducer mounted on the arm being slightly off tangent relative to most of the tracks of the media, which are arranged as concentric rings on the disk platters. Generally the greatest skew (positive and negative) occurs at the innermost and outermost tracks, and skew at or near zero at one or more middle tracks. As will be described in more detail below, transducer skew may impact performance of particular types of patterned media devices.

In reference now to FIG. 1A, a portion of a magnetic storage medium 100 is shown which includes an interspersed recording bit pattern. The interspersed data bit pattern includes a multiplicity of discrete recording bits 102 arranged in a generally staggered pattern. The recording bits 102 shown in the representative illustration of FIG. 1A are spaced apart from one another by a spacing distance, SD. The illustrated arrangement of bits 102 generally conforms to a polymer patterned media, which includes a staggered pattern of evenly spaced bits 102, e.g., adjacent bits within a track are arranged in two locations spaced apart in a staggered relationship. It is understood that other spacing configurations may be used to form a staggered recording bit pattern on a magnetic storage medium, such as patterns having different minimum bit spacing along different directions.

Recording bits are understood to be magnetic bits in which a transducer, such as a read/write head, can repeatedly record and/or overwrite data. The media 100 may also include servo bits (not shown) which help in positioning the transducer over the desired tracks and sectors of the media. Recording bits differ from servo bits, in that servo bits are typically not repeatedly recorded and/or overwritten in the same way as recording bits. Servo bits may be set to fixed patterns (e.g., magnetic orientations) during manufacture of the device. Thereafter, care is taken to ensure the servo bits are not overwritten.

The magnetic storage medium 100 supporting the interspersed data bit pattern may include a non-magnetic substrate with an overlying magnetic recording layer with perpendicular anisotropy, along with one or more interlayers between the substrate and the magnetic layer according to various implementations. The magnetic layer may be patterned to form the discrete recording bits 102, through, for example, lithographic patterning or self-organizing nanoparticle arrays.

According to embodiments in which the magnetic storage medium is implemented as a disk, the recording bits 102 extend around the disk and may be divided into a multiplicity of data regions or arrays, such as two or more concentrically spaced data tracks 104 arranged generally perpendicular to a radius 106 of the disk. It will be appreciated that data arrays having other configurations and geometries are contemplated (e.g., data arrays formed as straight rows of recording bits for magnetic storage media other than disks).

In FIG. 1A, the data tracks 104 include a staggered, two-bit wide bit pattern, it being understood that data tracks 104 may be wider than two bits according to various embodiments. A two-bit wide bit pattern defining the representative data tracks 104 shown in FIG. 1A. The data tracks 104 include a first group 104A of "even" recording bits and a second group 104B of "odd" recording bits. The terms "even" and "odd" in this context are used merely for purposes of clarity of explanation (e.g., to differentiate between different portions of a staggered pattern of recording bits defining the track 104), and is not intended to imply any particular features or functionality, other than to indicate relative staggered positions between the even and odd groups 104A-B. Generally, the staggering between the even and odd groups 104A-B is a result of the process used to manufacture the media, and so may need to be taken into consideration when writing to and reading from the bits 102.

Also illustrated in FIG. 1A is a transducer 108 that may be configured to read and/or write to the media 100. For purposes of the following discussion, the transducer 108 will be referred to as a write transducer, e.g., a magnetic write pole. Some aspects of the following discussion may also be applicable to read transducers, although the shape of a read transducer may be different than the illustrated transducer 108. Generally, spinning of the media 100 induces a motion relative to the transducer 108, the motion of the media 100 being indicated by arrow 110. The bits 102 move under transducer 108 during writing operations. The transducer 108 applies a magnetic field to each bit 102 as it passes by the transducer 108 during writing.

In some embodiments, the spacing SD between the bits 102 may be on the order of 10 nm, and it may be difficult to achieve acceptable performance (e.g., signal-to-noise ratio of a reader, field strength of a writer) from a transducer with cross track dimensions (e.g., along radial direction 106) of that scale. As result, the effective track width of such a device widened to encompass both the aforementioned even and odd groups 104A-B for each track 104. This increases the linear bit density of the tracks 104, while decreasing the number of tracks on the media surface. By using a wider track 104, the areal density if this arrangement can be about the same as if each group 104A-B were a separate track, and the wider track alleviates some difficulties in designing the transducer 108.

As a result of the track arrangement, the transducer 108 writes to successive even and odd bits within each track 104. In order to adequately induce a magnetic field in a particular recording bit 102 in the data track 104, the transducer 108 is controlled (e.g., via a VCM and arm) to maintain its position over a centerline of the track 104. Ideally, the transducer 108 will be able to maintain sufficient tracking along the track centerline so that the signals written to the even and odd groups 104A-B will be consistent. For example, in the position shown in FIG. 1A, the transducer 108 is positioned to write bit 102C, having just previously written bit 102B.

Figure 1B:
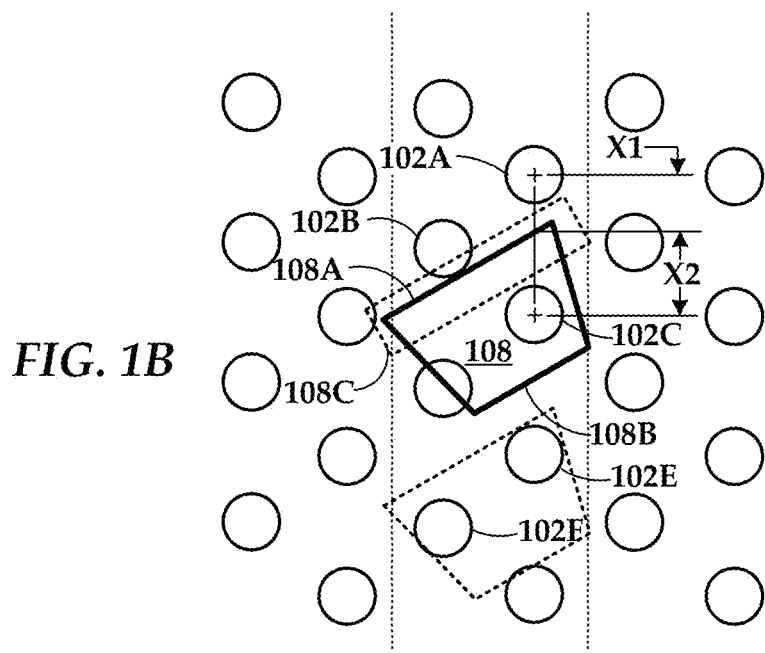

The ability to distinguish between even and odd bits in the same track may become more difficult when skew is taken into account. In FIG. 1B, a block diagram illustrates an example of transducer 108 in a skewed position. The skew angle shown in FIG. 1B is for purposes of illustration, and actual skew angles may be different than this in a particular device implementation. As evident in FIG. 1B, the skew can potentially result in the transducer partially or fully covering an even and odd bit at the same time, e.g., bits 102E and 102F as indicated by the dashed outline. This can result in increased bit-error rate (BER).

Two measurement values, X1 and X2, are shown in FIGS. 1A and 1B, and these measurement values can be used to mathematically formalize the effect of skew. Generally, X1 is a distance between a trailing edge 108A of the transducer and a center of the previously written odd bit 102A, and X2 is a distance between a trailing edge of the transducer and a center of the currently written odd bit 102C. The values of X1 and X2 are taken when the transducer 108 is substantially centered on the currently written bit 102C in a longitudinal direction, the longitudinal direction being defined as extending between midpoints of the trailing edge 108A and a leading edge 108B of the transducer 108. With zero-skew as seen in FIG. 1A, X1=X2. With the skew seen in FIG. 1B, X1<X2. In order to alleviate the above noted increase in BER, it is desirable to have X1≈X2 over a range of skew angles encountered by the transducer 108.

As will be described in greater detail below, the transducer 108 includes an adaptation in trailing edge region 108C, which is indicated by dashed lines in FIGS. 1A and 1B. This region 108C may include a protruded section that facilitates writing data to two locations (e.g., bits 102A, 102C) spaced apart from one another relative to the transverse axis for a range of skew angles. Example configurations at region 108C are described in greater detail below.

Figure 2A:
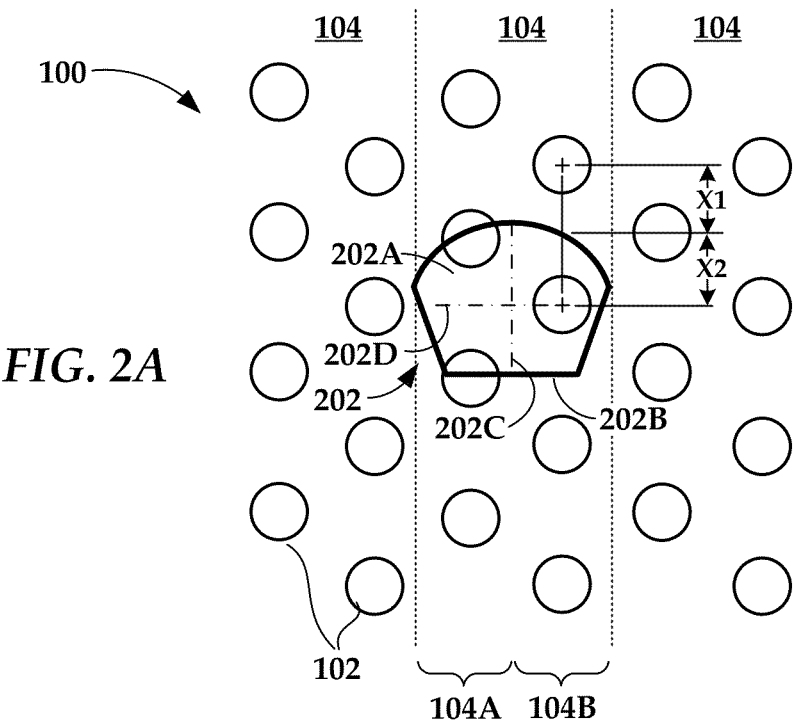
FIGS. 2A-2B are block diagrams of a writer and media according to another example embodiment.
Figure 2B:
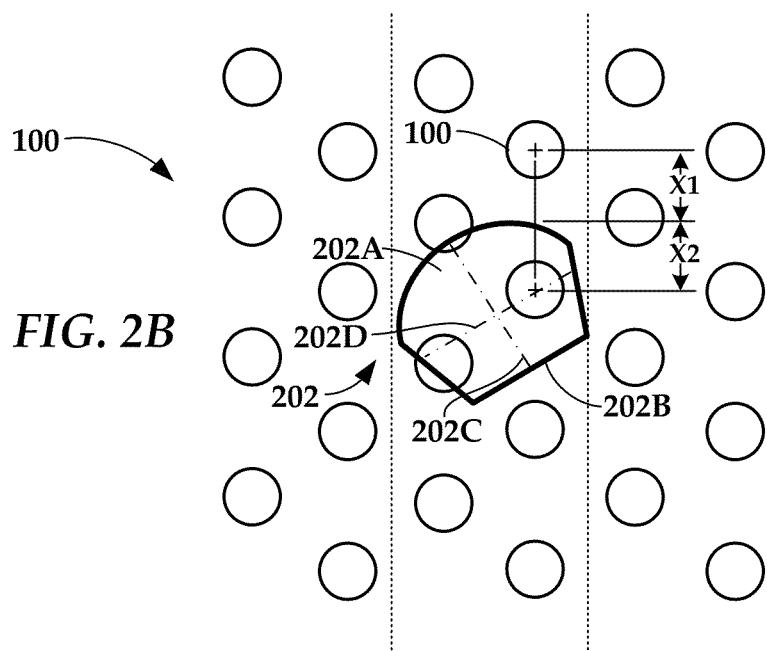

In reference now to FIGS. 2A and 2B, a block diagram illustrates a configuration of a tip of a write pole 202 (hereinafter referred to as just "write pole 202") according to an example embodiment. The trailing edge of the write pole 202 includes a curved protruded section 202A. The write pole 202 is shown in FIG. 2A at a zero-skew orientation relative to the media 100, whereas the write pole is shown in FIG. 2B as being skewed. Generally, in the zero-skew orientation, a longitudinal axis 202C of the write pole 202 is parallel to the tracks 104, and a transverse axis 202D is normal to the tracks 104. The orientations of the axes 202C-D are rotated by the skew angle as shown in FIG. 2B.

Although the write pole 202 exhibits different skew angles in FIGS. 2A and 2B, the aforementioned leading edge to bit distances X1 and X2 are approximately equal in both figures. A result, this embodiment can minimize skew-induced bit errors over a range of skew angles. For example, the trailing edge portion 202A will not significantly overlap even and odd bits at the same time over the range of skew angles. The skew angles may be, for example, between about 10 and about 20 degrees either positive or negative, e.g., about ±15 degrees, about ±18 degrees, etc. The range can also be asymmetric, such as +15 to −18 degrees. It will be understood that the term "about" is intended to define a range that is within a reasonable manufacturing and/or operating tolerance for this class of device.

In reference now to FIGS. 3 and 4, respective plan view at a media facing surface and cross-section view illustrate a read/write transducer 300 having a write pole 202 configured according to the example shown in FIGS. 2A and 2B. The tip of the write 202 pole is seen in FIG. 3, and is surrounded by portions 302 and 304 that can serve both as return poles and as shielding. Gaps 301, 303 between the write pole 202 and other portions may be filled by an appropriate material, e.g., a dielectric such as SiOx. The write pole 202 and shielding/pole portions 302, 304 collectively form a writer 305. As seen in FIG. 4, the writer 305 also includes a coil 308 having individual windings 309, which are shown in cross-section. When energized, the write coil 308 induces a perpendicular magnetic field out of the tip of write pole 202 into the media (not shown), and the magnetic lines of flux return via one or both portions 302/304. By selectively energizing the coil 308, the write pole 202 can change magnetic orientation of media held proximate the air bearing surface (ABS) 320, the ABS being shown in FIG. 4.

The transducer 300 also includes a reader 310 that has reader stack 312 surrounded by respective upper and lower shields 314, 316. The reader stack 312 may include any type of magnetic sensor, such as a giant magnetoresistive (GMR) sensor, that detects magnetic orientation of moving media held proximate the ABS 320. Signals generated by the reader stack 312 are processed and decoded to read data stored on the media.

Figure 5:
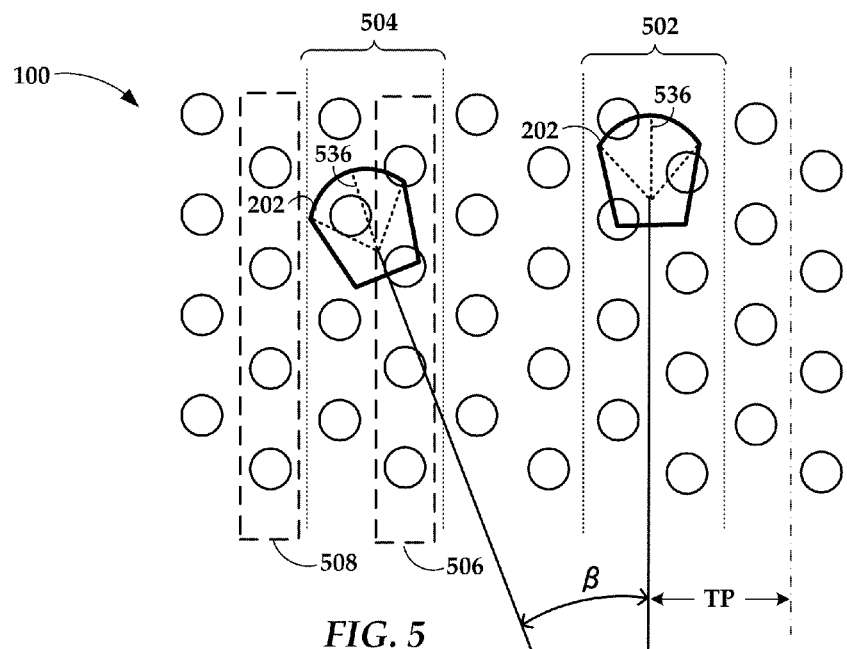
FIGS. 5 and 6 are block diagrams illustrating dimensional parameters of a writer according to example embodiments.
Figure 6:
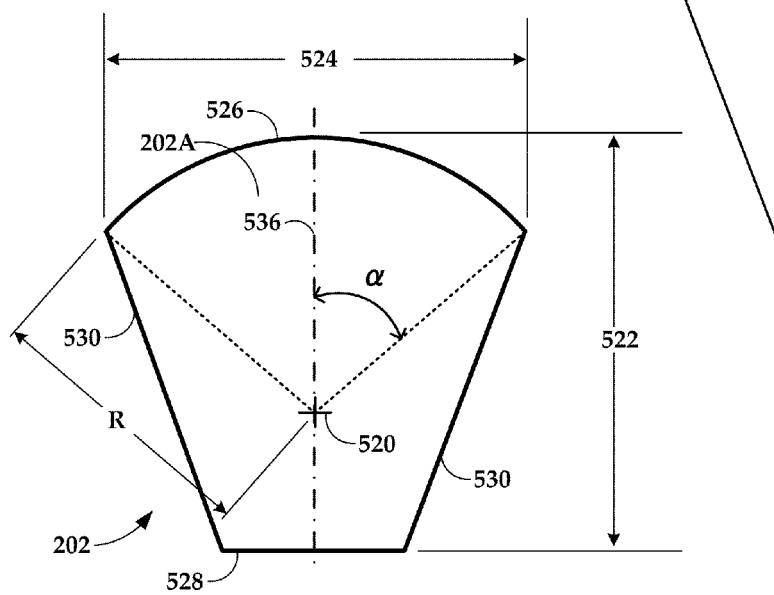

In reference now to FIGS. 5 and 6, block diagrams illustrate additional details of a write pole 202 according to an example embodiment. In FIG. 5, the write pole 202 is shown positioned over media surface 100 in two orientations: zero-skew over track 502; and maximum skew β, in one direction. It will be appreciated that the relative proportions shown in FIG. 5 may be exaggerated for purposes of clarity. As seen in FIG. 6, the geometry of the curved protruded section 202A can be represented by two parameters, the radius R and half-angle α. For the purposes of this discussion, it may be assumed that the protruded section 202A is symmetric with respect to the writer pole 202 as a whole. For example, trailing edge 526 and leading edge 528 may be center-aligned with one another so that left and right sidewalls 530 are approximate mirror images of one another. In a symmetric configuration, the origin 520 of the radius R and value of α may be derivable based on the overall height and width dimension 522, 524 of the write pole. For non-symmetric implementations, additional parameters (not shown) may be specified, such as defining a vertical and horizontal offset of origin 520 from midpoint of the write pole 202, and/or by definition (e.g., sizes and/or angles) of perimeter features 526, 528, and 530.

The diagrams of FIGS. 5 and 6 can be used to mathematically represent some aspects of the writer pole 202 tip geometry relative to maximum skew angle, β, and track pitch TP. Track pitch TP is the center-to-center distance between adjacent tracks, and may be relatively constant over the entire media surface. The maximum skew angle β may be known for a given design, and may be different depending on whether the skew is negative or positive. One or both of TP and β may be used in determining acceptable and/or optimal values of R and α.

Considerations for selecting R and α include ensuring that the write pole 202, when positioned at a maximum skew over track 504, does not miss the row of bits 506 within track 504. This first consideration may be expressed mathematically as $R*\sin(\alpha-\beta)>TP/4$. A second consideration is that the write pole 202, when positioned at a maximum skew over track 504, does not erase bits 508 adjacent to track 504. This second consideration may be expressed mathematically as $R*\sin(\alpha+\beta)>3*TP/4$. It will be understood these formulas are based on the he servo control system positioning the write head, over the range of skew angles, such that a centerline 536 of the writer pole 202 is centered over the centerline of the respective track 502, 504.

Figure 8:
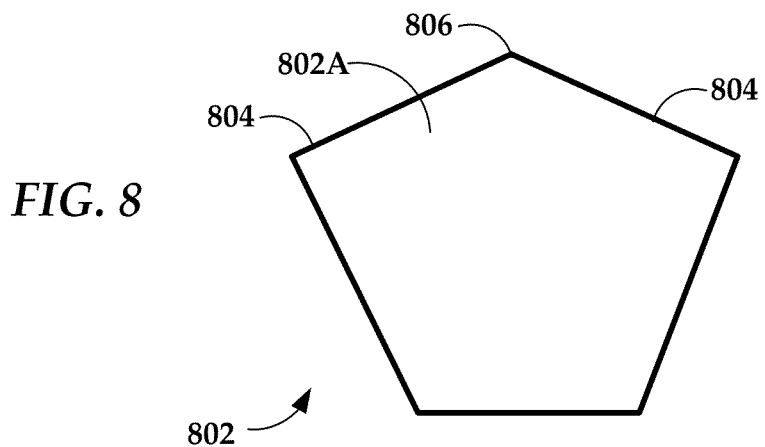
Figure 9:
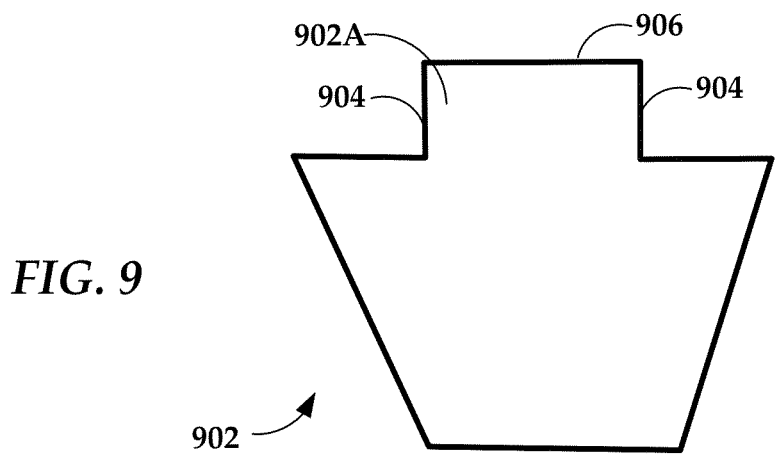

The curved protruded section 202A of the write pole 202 shown in the previous figures may achieve minimal skew-induced BER over a wide range of angles. The protruded section may both prevent missing a staggered row of bits within a track, and prevent inadvertently overwriting a staggered row of bits in an adjacent track. However, an approximation of the curved protrusion 202A may be utilized that also reduces skew-induced BER, although possibly less than the curved implementation. These alternate designs may be desirable for other reasons, such as ease of manufacture, tunable magnetic flux gradients, etc. Alternate write pole designs according to example embodiments are shown in FIGS. 7-9.

Figure 7:
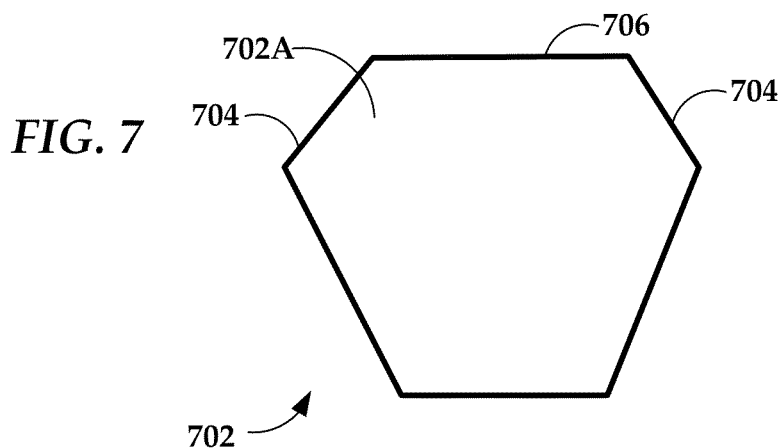
FIGS. 7-9 are block diagrams illustrating write pole geometries according to additional embodiments.

In FIG. 7, a tip of a write pole 702 includes a protruded section 702A that includes two chamfers 704 and a flat trailing edge 706. In FIG. 8, two chamfers 804 join together at a peak 806 to form protruded section 802A at the trailing edge of write pole 802. In FIG. 9, a tip of write pole 902 includes a protruded section 902A that includes two vertical sides 904 and a flat trailing edge 906. It will be appreciated that many variations are possible on these write pole embodiments 702, 802, 902. For example, write poles 702, 802 may have additional chamfers to more closely approximate a curve. Similarly, write pole 902 may include additional rectangular portions that form a step-wise approximation of a curved edge.

Figure 11:
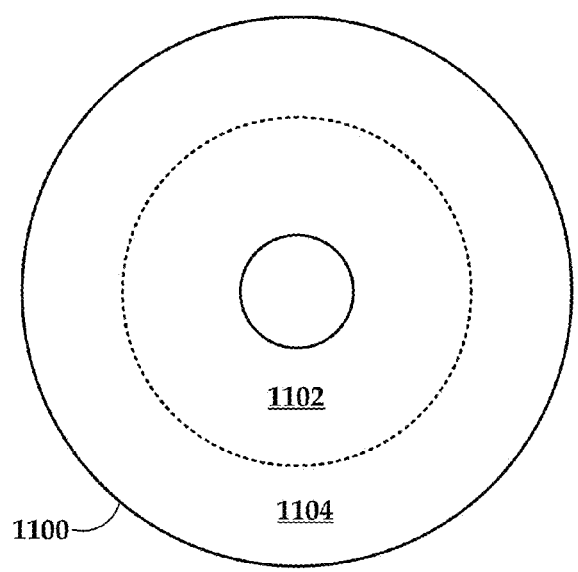
FIG. 11 is a plan view showing media regions of a media usable by a transducer as shown in FIG. 10.

In the embodiments described above, the reader/writer utilizes a single write pole. It will be appreciated that the concepts described above may also be applied to designs with more than one write pole. For example, a multi-writer arrangement is described in commonly owned U.S. patent application Ser. No. 12/098,114, filed Apr. 4, 2008, which is hereby incorporated by reference in its entirety. As shown in FIG. 11, a first writer of the multi-writer arrangement may dedicated to writing to a first radial region (e.g., inner region 1102 of disk 1100) and a second writer may be dedicated to writing a second radial region (e.g., outer region 1104 of disk 1100). It will be understood that there may be some overlap between the dedicated regions 1102, 1104 such that a writer dedicated for writing to one region may write to at least part of another region. For example, one or both of the writers may be used to extend into some portion of a region to which it they are not dedicated if such modification reduces overall BER. This ability to write outside dedicated regions may be configured/modified during manufacture, initial configuration, and/or at a runtime of the storage device.

The first and second writers for regions 1102, 1104 may include a beveled side wall at the pole tip to reduce overwriting adjacent tracks due to skewing at skew angles particular to each region 1102, 1104. For example, one or both of the pole tips may be asymmetric trapezoids and/or parallelograms, and the pole tips may be mirror images of one another. Generally, one sidewall of the pole tip may be referred to as "beveled," indicating that the side wall has is angled more than the opposite sidewall in order to optimize the pole tip for maximum skew of one of the disk regions 1102, 1104. The beveled sidewalls of the writer pole tips may face towards each other, or away from each other.

Figure 10:
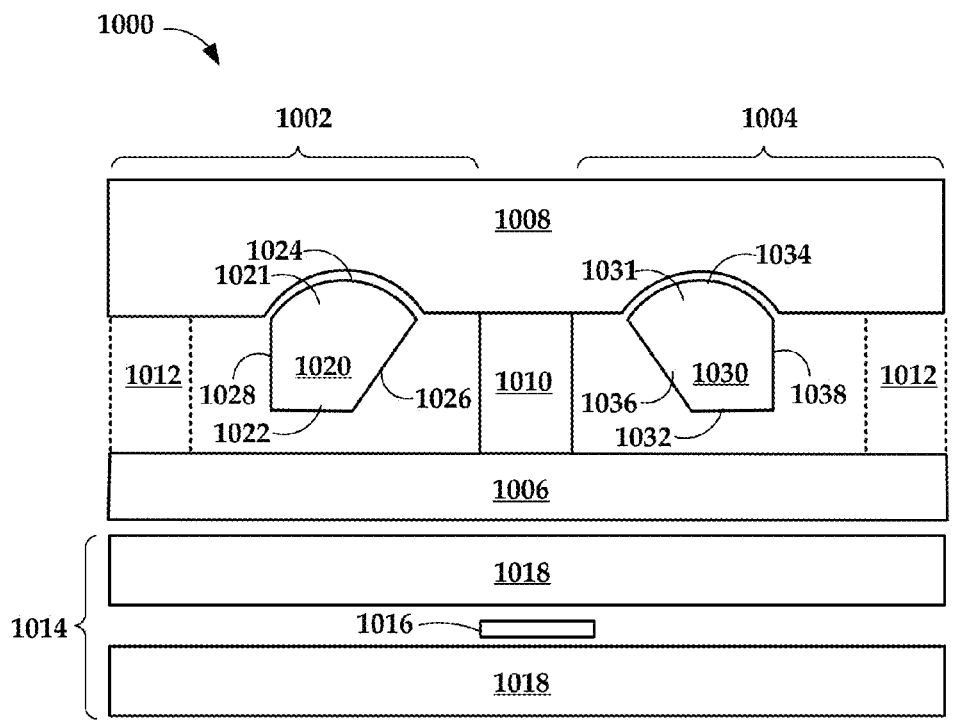
FIG. 10 is s a plan view of a dual-writer transducer assembly as seen from a media reading surface according to an example embodiment.

An example of a multi-writer arrangement according to an example embodiment is shown in the ABS-facing view of FIG. 10. A transducer head 1000 includes a first writer 1002 dedicated to writing at least a first region (e.g., outer region 1104 of FIG. 11) of a disc, a second writer 1004 dedicated to writing at least a second region (e.g., an inner region 1102 of FIG. 11) of the disc. The first and second writers 1002, 1004 include respective first and second return poles 1006, 1008, a shield 1010, optional side shields 1012 and a reader assembly 1014. The reader assembly 1014 includes a read sensor element 1016 positioned between a pair of reader shields 1018. In the illustrated embodiment, one of the reader shields 1018 is positioned adjacent to and substantially parallel with the first return pole 1006, and the read sensor element 1016 is substantially aligned with the shield 1010, in between the first and second writers 1002 and 1004.

The first writer 1002 includes a main pole that defines a pole tip 1020. In the illustrated embodiment, the pole tip 1020 has an asymmetrical, trapezoidal shape along the ABS, with a curved, protruded portion 1021 extending towards and/or into the return pole/shield 1008. A perimeter of the pole tip 1020 is defined by a leading edge 1022, a trailing edge 1024, and two sidewalls 1026 and 1028. The leading and trailing edges 1022 and 1024 are arranged opposite one another, with the leading edge 1022 being approximately parallel with a line formed by the intersection of the trailing edge 1024 with sidewalls 1026, 1028.

The sidewalls 1026 and 1028 are arranged opposite one another, in a non-parallel configuration with respect to each other, such that the sidewall 1026 defines a beveled edge of the first writer 1002. The sidewall 1028 joins the leading edge 1022 at approximately a right angle. The sidewall 1026 is configured at a non-zero wall angle, for example at a 7.5 degrees, 11 degrees, 15 degrees, or other wall angle, which can vary as desired for particular applications. Depending upon a configuration of a suspension assembly to which the transducer 1000 is mounted, the pole tip 1020 can be configured for dedicated writing in either inner or outer regions 1102, 1104 of disc 1100.

The second writer 1004 includes a main pole that defines a pole tip 1030. In the illustrated embodiment, the pole tip 1030 has an asymmetrical, trapezoidal shape along the ABS, with a curved, protruded portion 1031 extending towards and/or into the return pole/shield 1008. A perimeter of the pole tip 1030 is defined by a leading edge 1032, a trailing edge 1034, and two sidewalls 1036 and 1038. The leading and trailing edges 1032 and 1034 are arranged opposite one another, with the leading edge 1032 being approximately parallel with a line formed by the intersection of the trailing edge 1034 with sidewalls 1036, 1038.

The sidewalls 1036 and 1038 are arranged opposite one another, in a non-parallel configuration with respect to each other, such that the sidewall 1036 defines a beveled edge of the second writer 1004. The sidewall 1038 joins the leading edge 1032 at approximately a right angle. The sidewall 1036 is configured at a non-zero wall angle, for example at a 7.5 degrees, 11 degrees, 15 degrees, or other wall angle, which can vary as desired for particular applications. Depending upon a configuration of a suspension assembly to which the transducer 1000 is mounted, the pole tip 1030 can be configured for dedicated writing in either inner or outer regions 1102, 1104 of disc 1100.

It will be understood that many variations are possible in view of the teachings related to FIGS. 10 and 11. For example, the pole tips 1020, 1030 may be arranged opposite to one another, such that beveled edges 1026, 1036 face outwards. The pole tips 1020, 1030 may be rotated such that edges 1028, 1038 are out of normal relative to shield/return pole 1006. Similarly, the border between regions 1102, 1104 need not occur at a mid-position, and the border may be modified based on particular device conditions, in-use conditions, etc.

Figure 12:
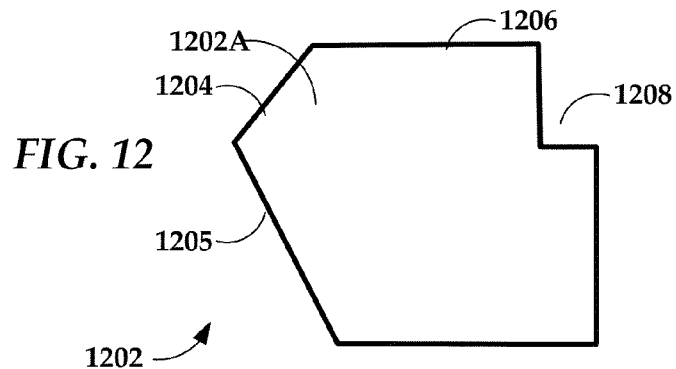
FIGS. 12-15 are block diagrams illustrating dual-writer write pole geometries according to additional embodiments.
Figure 13:
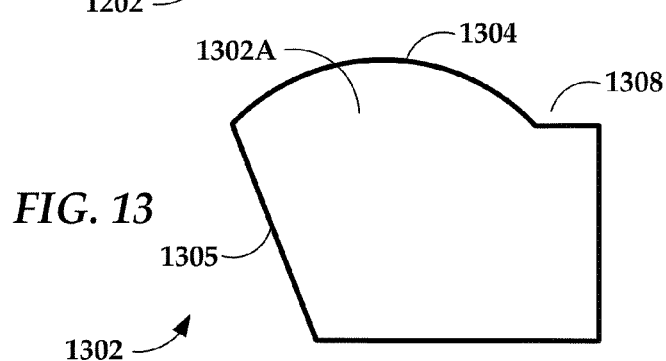
Figure 14:
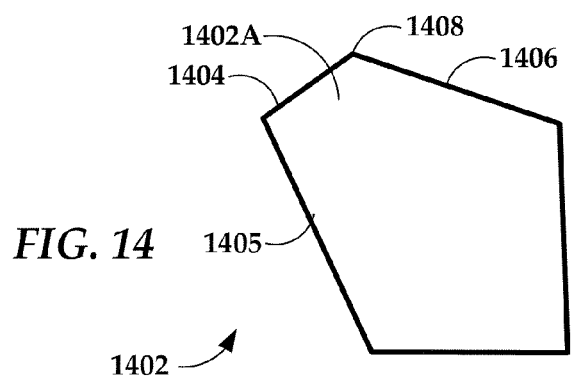
Figure 15:
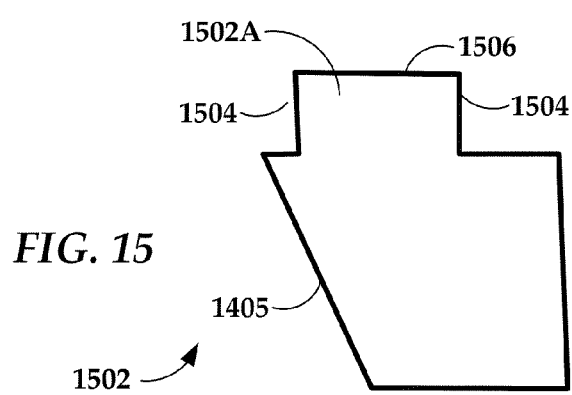

In FIGS. 12-15, block diagrams illustrate write pole tip geometries according to alternate embodiments that may be used in an arrangement as shown in FIGS. 10 and 11. In FIG. 12, a tip of a write pole 1202 includes a protruded section 1202A that includes a chamfer 1204, beveled sidewall 1205, flat trailing edge 1206, and a corner notch 1208. In FIG. 13, a tip of a write pole 1302 includes a protruded section 1302A that joins with beveled sidewall 1305 at one end and notch 1308 at the other end. In FIG. 14, two chamfers 1404, 1406 join together at a peak 1408 to form protruded section 1402A at the tip of write pole 1402. The shorter chamfer 1404 joins with beveled sidewall 1405. In other arrangements, the chamfers 1404, 1406 may be substantially symmetric, or a longer of the chamfers 1404, 1406 joins with beveled sidewall 1405. In FIG. 15, a tip of write pole 1502 includes a protruded section 1502A that includes two vertical sides 1504 and a flat trailing edge 1506. The protruded portion 1502A is closer to beveled sidewall 1505 than to the opposite sidewall, although in other embodiments the protruded portion may be shifted to the right.

A transducer utilizing any of the write pole tips shown in FIGS. 12-15 in a first writer may use a matching, mirror image version for a second writer. In such a case, the respective beveled edges may be facing out or in. In other arrangements, a first and second writer different may use different write pole tips as shown in FIGS. 10 and 12-15. For example, a write pole configuration 1302A as shown in FIG. 13 may be used in place of write pole configuration 1030 in FIG. 10 together with write pole 1020 substantially as illustrated in FIG. 10. Additionally, the variations (e.g., additional chamfers, additional rectangular portions) described in regards to FIGS. 7-9 may be equally applicable to the configurations shown in FIGS. 12-15.

Figure 16:
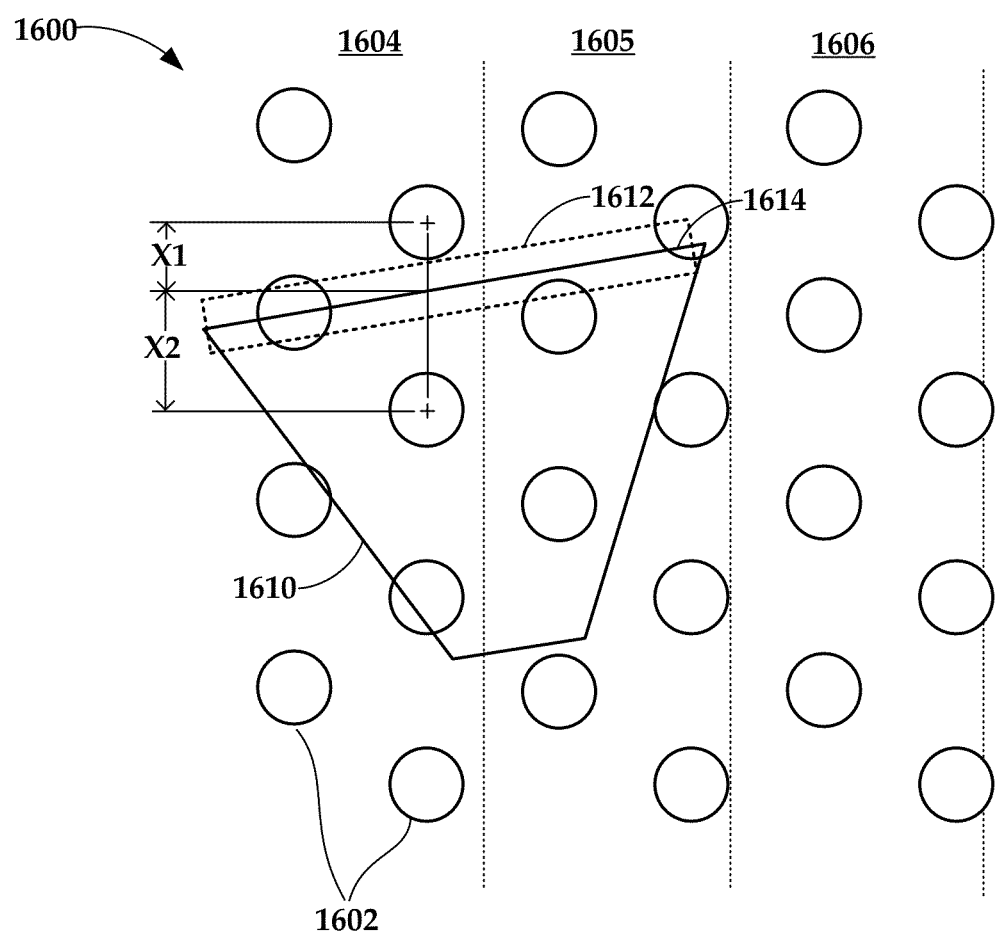
FIG. 16 is a block diagram of a shingled writer and media according to an example embodiment.

In reference now to FIG. 16, a block diagram illustrates an alternate writer configuration according to an example embodiment. As with previous examples, media 1600 includes tracks 1604-1606 each having two rows of staggered bits 1602. In this example, a write pole tip 1610 (hereinafter referred to just as "write pole 1610") is wider than one track, specifically two tracks wide in this example although other widths are possible. Other than the width, other aspects of the write pole 1610 (e.g., leading and trailing edges, theory of operation) may be similar to previously described write poles. Generally, enlarging the write pole 1610 facilitates ease of manufacture and increased magnetic field during writing. However, because the write pole 1610 spans more than one track, a technique alternately known as shingled magnetic recording (SMR), high track density recording (HTDR), banded recording, etc., may be used.

Generally, shingled recording involves partial layering of tracks one atop another. For example, assuming tracks 1604-1606 are written by the write pole 1610 in that order, track 1604 would first be written, which would also write over track 1605. In the next pass, the write pole would write the data for track 1605 which would overwrite track 1606 as well. This would continue for a predetermined number of tracks, herein referred to as a group of tracks. Shingled recording allows writing with a larger, more powerful write pole 1610 at a data rate similar to a conventional single track width write pole. However, because writing one track overwrites one or more neighboring tracks, a group of tracks are written together, the groups being spaced far enough apart that the track groups can be independently written and rewritten. However, the tracks (and sectors therein) within a group are not randomly written/rewritten. As a result, a shingled recording device may use other adaptations (e.g., large non-volatile cache, large minimum sector sizes, differentiation between random and sequential data, etc.) to account for this random write behavior.

As with the single track writer of FIGS. 1A and 1B, the write pole 1610 may also exhibit high BER at maximum skew. There may also be timing modulation issues in shingled writing mode with staggered media at skew that reduces writing margin and degrades BER performance. As with those previous examples, this tendency for increased BER may be expressed as a change in X1 and X2 at maximum skew, as shown in FIG. 16. Also as with those examples, the write pole 1610 may include features 1612 at a trailing edge 1614 to minimized skew-induced BER. These features may, for example, ensure X1 and X2 do not differ significantly over a range of skew angles. In some embodiments, this may be achieved by extended the protruded trailing edge designs shown in FIGS. 6-9 in the cross-track dimension so that the writer pole tips cover more than one track. An alternate approach, described below, includes two or more protruded sections, at least one of which is placed over a single track during shingled writing.

Figure 17A:
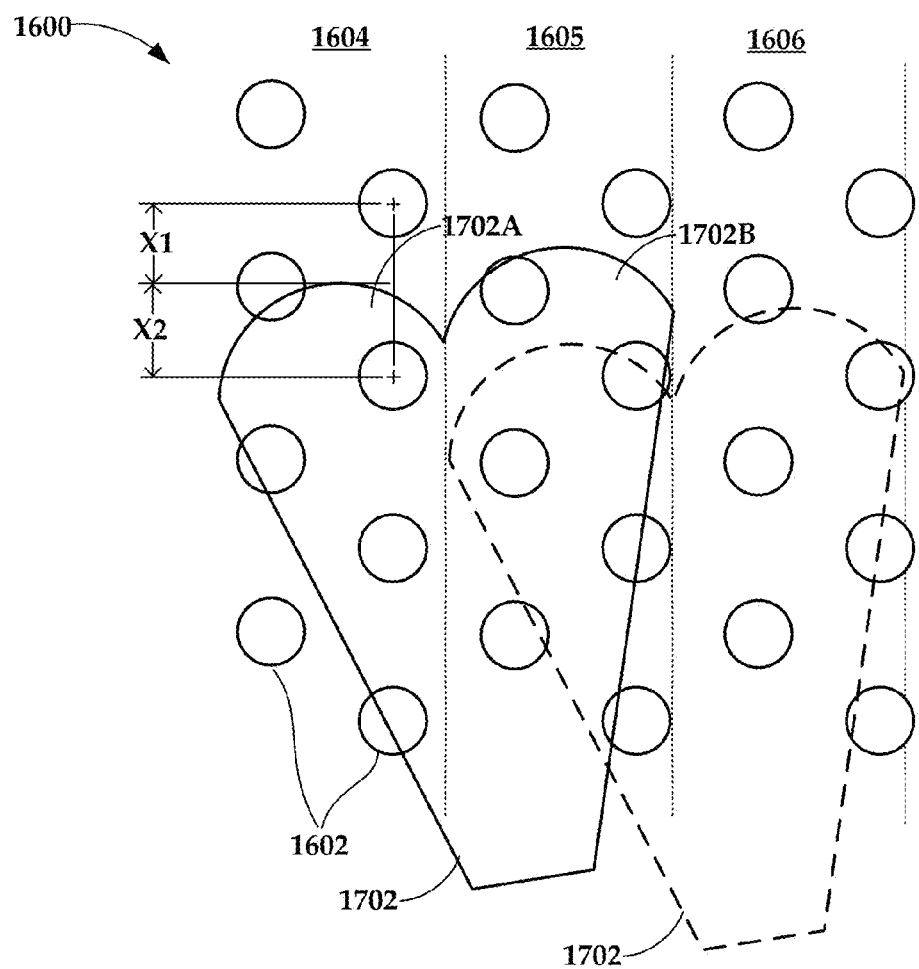
FIGS. 17A-17B are block diagrams of a shingled writer and media according to another example embodiment.

In reference now to FIG. 17A, a diagram illustrates a shingled writer write pole tip 1702 according to an example embodiment. The write pole 1702 includes two protruded portions 1702A-B that each have a curved profile. A trailing edge shield (not shown) may have a corresponding cutout, similar to the shields 302 and 1008 shown in FIGS. 3 and 10, respectively. As shown in FIG. 17A, the write pole 1702 is oriented at a first maximum skew angle, and protruded portion 1702A is positioned over the currently written track 1604. The dashed line indicates a location of the write pole 1702 as the next track is being written. At this skew angle (which may be either near the inside or outside of the disk), writing is performed from left to right, starting at track 1604 and ending at track 1606 of this portion of the media 1600.

Figure 17B:
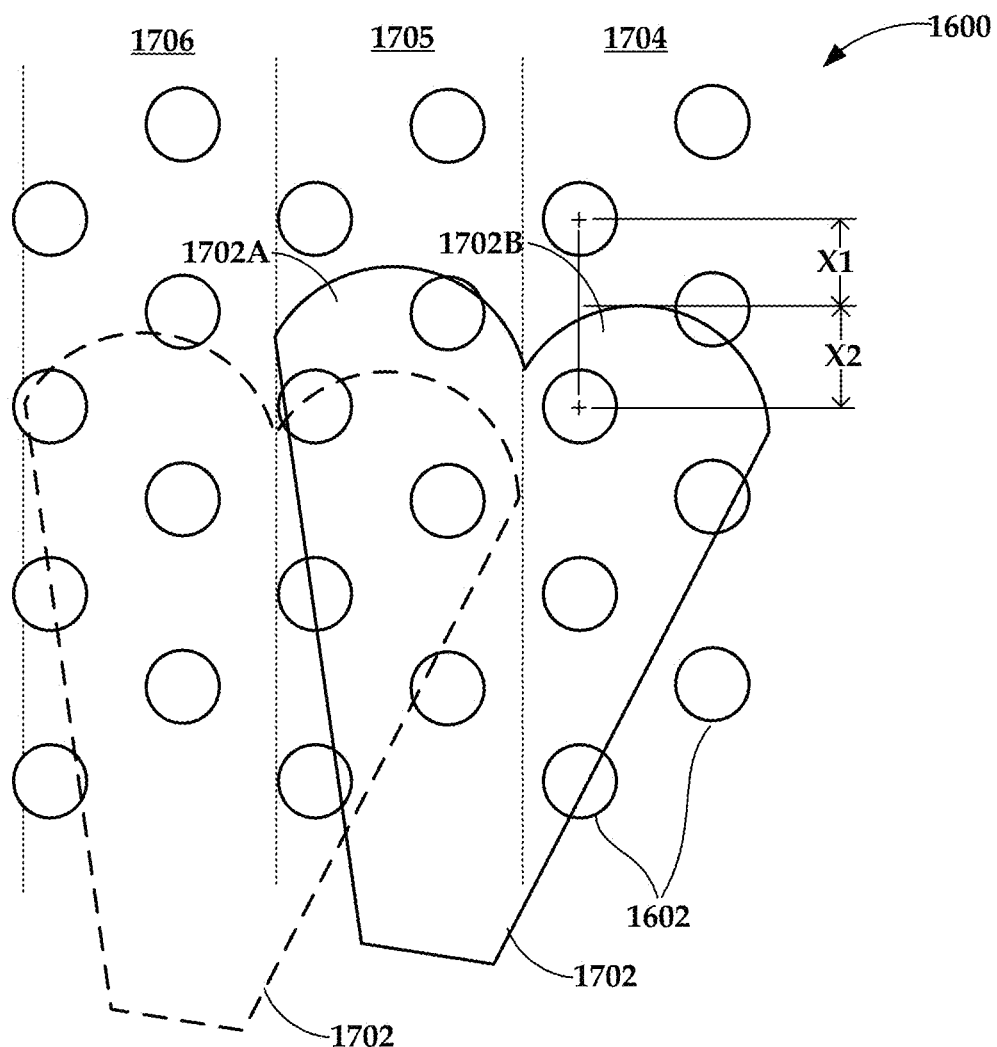

At an opposite skew angle, as shown in FIG. 17B, the write pole 1702 is tilted in the opposite direction relative to tracks 1704-1706. In this case, the writing may occur from right to left, starting at track 1704 and proceeding to tracks 1705 and 1706. The dashed line indicates a location of the write pole 1702 as it is writing the next track 1705. In other arrangements, the order of reading tracks may be the same as in FIG. 17A when skewed as shown in FIG. 17B, in which case track 1705 may be currently written track and the dashed line indicates the previously written track 1706. It should be noted that in such an arrangement, the second protruded section 1702B may be optional.

Figure 18:
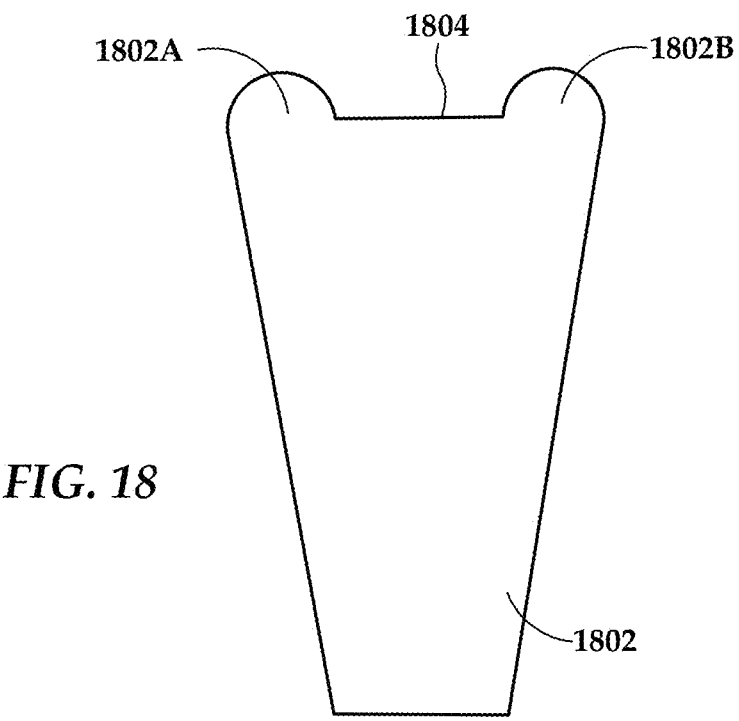
FIG. 18 is a block diagram of a shingled writer geometry according to another example embodiment.

The geometry shown in FIGS. 17A and 17B may be modified in a similar fashion to previously described embodiments. For example, the curves at the trailing edge protruded sections 1702A-B may take on profiles such as shown in FIGS. 7-9 and 12-15, and the write pole 1702 may be used in a dual writer design such as shown in FIG. 10. Another embodiment is shown in FIG. 18, where a write pole tip 1800 includes two curved protruded portions 1802A-B with a flat trailing edge portion 1804 therebetween. The protruded portions 1802A-B may have alternate shapes as previously described, e.g., in FIGS. 7-9 and 12-15.

Figure 19:
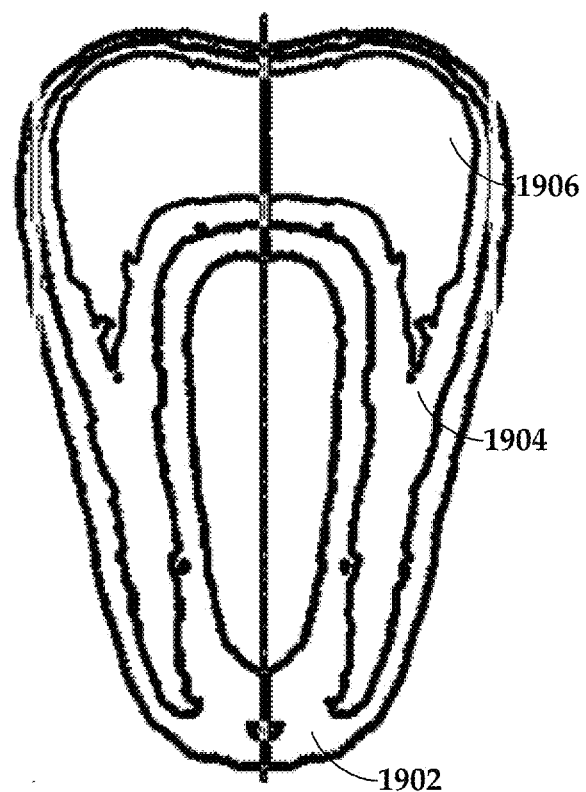
FIG. 19 is a graph illustrating results of analytical modeling of magnetic field strength at the middle of a media stack for a shingled writer according to an example embodiment.
Figure 20:
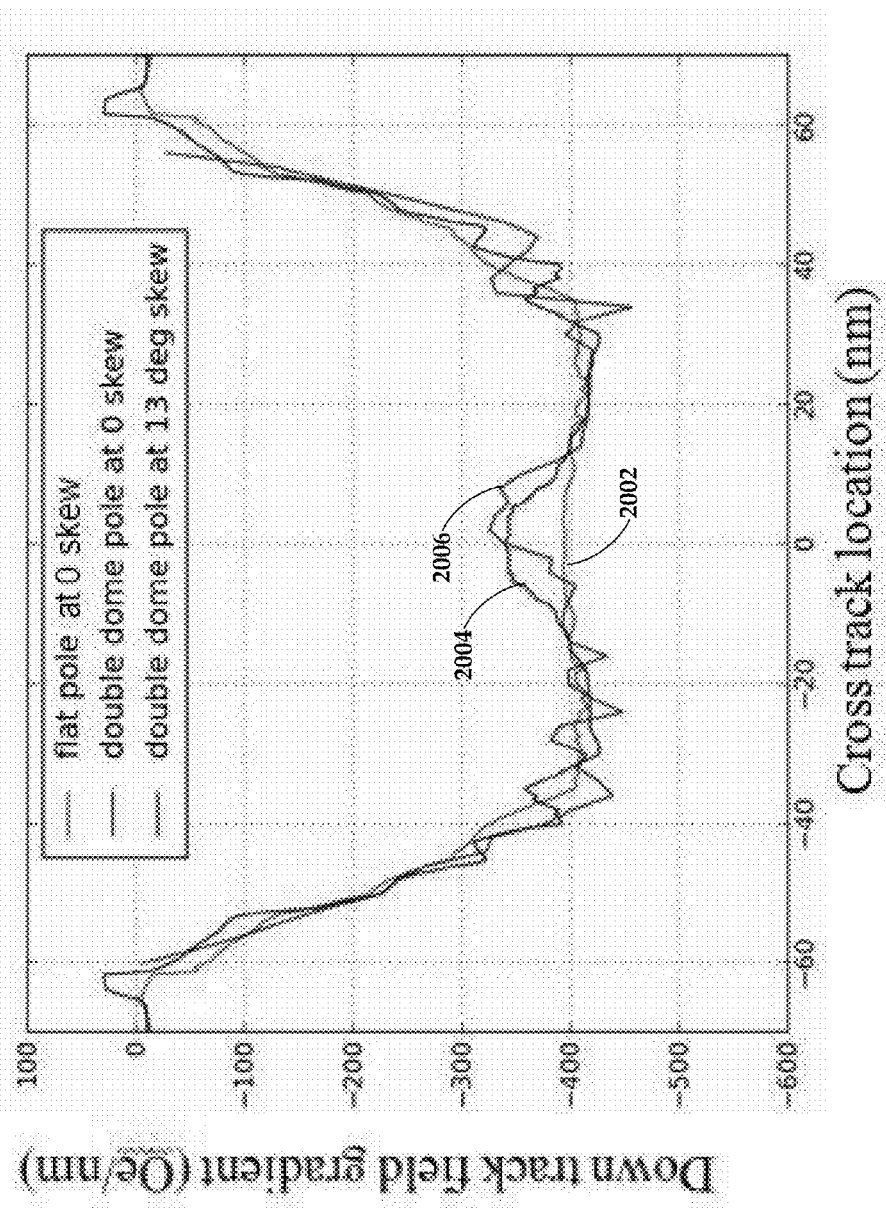
FIG. 20 is a chart illustrating results of analytical modeling of magnetic field gradient for a shingled writer according to an example embodiment.

A "double-dome" writer pole such as shown in FIGS. 17A-17B was modeled to determine magnetic field strength at the middle of a media stack for example write pole embodiments. A result of one such model is shown in the graph of FIG. 19. Regions 1902, 1904, and 1906 correspond to 9 kOe, 10 kOe, and 11 kOe contours, respectively. This result shows the occurrence of a desired, double-dome shape at the trailing edge. Results of a downtrack magnetic field gradient analysis are shown in the graph of FIG. 20. Curve 2002 represents a flat trailing edge write pole at zero-skew, curve 2004 represents a double dome pole at zero-skew, and curve 2006 represents the double dome pole at 13 degrees skew. The geometry of the flat trailing edge writer has the same dimensions as the double dome writer except for the trailing edge shape. For the double dome writer, the maximum absolute value of field gradient occurs at off-track locations, which is desired for this particular design. In such a case, magnetic dots will be recorded by the edge, rather than the middle, of the writer. So the decreased field gradient in the middle of the pole may not be of concern.

Comparing the zero-skew curves 2002, 2004, it can be seen that that the maximum absolute value of the gradient for the double dome writer is equivalent to that of the flat trailing edge writer. As described above, the down track field gradient of the double dome writer pole tip is insensitive to the skew, as illustrated by comparison between curves 2004 and 2006.

Figure 21:
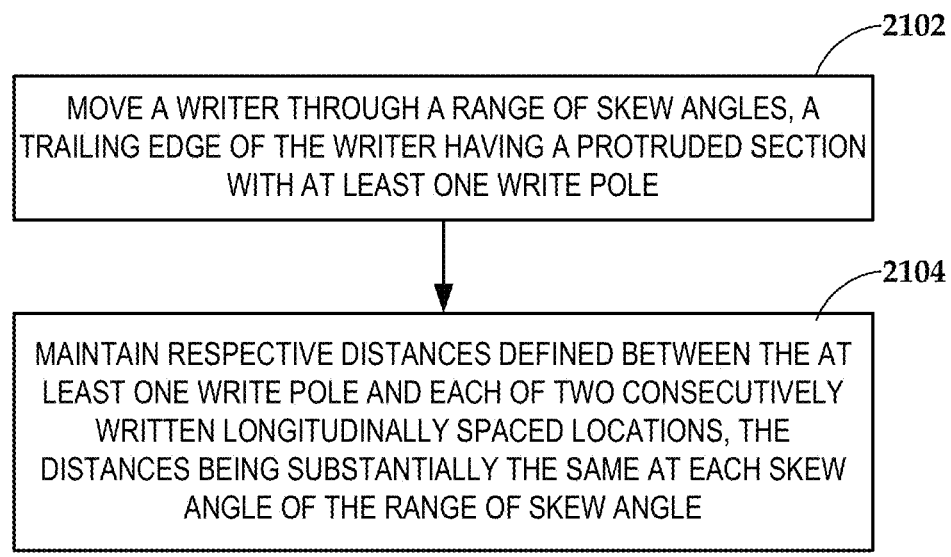
FIG. 21 is a flowchart of a procedure according to an example embodiment.

In reference now to FIG. 21, a flowchart illustrates a procedure according to an example embodiment. The procedure involves moving 2102 a writer through a range of skew angles. A trailing edge of the writer has a protruded section with at least one write pole. Respective distances defined between the at least one write pole and each of two consecutively written longitudinally spaced locations are maintained 2104. The same at each skew angle of the range of skew angles. The protruded section may include a center that can be oriented along a centerline of a track of data locations for the range of skew angles. In one variation, the range of skew angles is at least about +/−10 degrees, and in another variations, the range of skew angles is at least about +/−18 degrees.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A writer, comprising:
   a leading edge, a trailing edge, a longitudinal axis defined between the leading and trailing edges, and a transverse axis orthogonal to the longitudinal axis;
   a writer region provided at a protruded section of the trailing edge oriented along the longitudinal axis; and
   a write pole arranged at the protruded section and configured to write data to two locations spaced apart from one another relative to the transverse axis for a range of skew angles.

2. The writer of claim 1, wherein the write pole is arranged at the protruded section and configured to write data to two locations spaced apart in a staggered relationship for the range of skew angles.

3. The writer of claim 1, wherein the protruded section comprises a curved section.

4. The writer of claim 1, wherein the protruded section comprises a polygonal shaped section.

5. The writer of claim 1, wherein the write pole is arranged at the protruded section and configured to write data to at least two space-apart arrays of magnetic islands of a magnetic recording medium.

6. The writer of claim 1, wherein the write pole is arranged at the protruded section and configured to write data to at least two staggered space-apart arrays of magnetic islands of a magnetic recording medium.

7. The writer of claim 1, wherein writing data at different skew angles within the range of skew angles by the write pole arranged at the protruded section compensates for timing modulation at the different skew angles.

8. The writer of claim 1, wherein respective distances defined between the write pole and each of two consecutively written longitudinally spaced locations remain substantially equal at each skew angle of the range of skew angles.

9. The writer of claim 1, wherein the protruded section comprises a center that can be oriented along a centerline of a track of data locations for the range of skew angles.

10. The writer of claim 1, wherein the range of skew angles is at least about +/−15 degrees.

11. The writer of claim 1, wherein the range of skew angles is at least about +/−18 degrees.

12. The writer of claim 1, wherein the protruded section comprises two arcuate shaped sections.

13. The writer of claim 12, wherein:
   the protruded section comprises a left side and a right side;
   one of the two arcuate shaped sections is located at the left side; and
   the other of the two arcuate shaped sections is located at the right side.

14. A transducer, comprising:
   a slider comprising an air bearing surface;
   a reader provided on the slider, at least a portion of the reader defined on the air bearing surface; and
   a writer provided on the slider, at least a portion of the writer defined on the air bearing surface and comprising:
   a leading edge, a trailing edge, a longitudinal axis defined between the leading and trailing edges, and a transverse axis orthogonal to the longitudinal axis;
   a writer region provided at a protruded section of the trailing edge along the longitudinal axis; and
   at least one write pole arranged at the protruded section and configured to write data to two locations spaced apart from one another relative to the transverse axis for a range of skew angles.

15. The transducer of claim 14, wherein the protruded section has a generally arcuate or semicircular shape.

16. The transducer of claim 14, wherein the protruded section has a generally polygonal shape.

17. The transducer of claim 14, wherein the at least one write pole is arranged at the protruded section and configured to write data to two staggered space-apart arrays of magnetic islands of a magnetic recording medium.

18. The transducer of claim 14, wherein writing data at different skew angles within the range of skew angles by the at least one write pole arranged at the protruded section compensates for timing modulation at the different skew angles.

19. The transducer of claim 14, wherein respective distances defined between the at least one write pole and each of two consecutively written longitudinally spaced locations are substantially the same at each skew angle of the range of skew angles.

20. The transducer of claim 19, wherein attaining substantially the same respective distances reduces or substantially eliminates timing variation in writing data to the two consecutively written longitudinally spaced locations.

21. A method, comprising:
  moving a writer through a range of skew angles, a trailing edge of the writer comprising a protruded section with at least one write pole; and
  maintaining respective distances defined between the at least one write pole and each of two consecutively written longitudinally spaced locations, wherein the distances are substantially the same at each skew angle of the range of skew angles.

22. The method of claim 21, wherein the protruded section comprises a center that can be oriented along a centerline of a track of data locations for the range of skew angles.

23. The method of claim 21, wherein the range of skew angles is at least about +/−10 degrees.

24. The method of claim 21, wherein the range of skew angles is at least about +/−18 degrees.

\* \* \* \* \*